US006109620A

United States Patent [19]

Roberts et al.

[11] Patent Number: 6,109,620

[45] Date of Patent: Aug. 29, 2000

[54] SHANK ADAPTER

[75] Inventors: Nigel Roberts, Birdhill; John O'Brien; Joseph Dillon, both of Limerick, all of Ireland

[73] Assignee: Boart Longyear Limited, Ireland

[21] Appl. No.: 09/125,629

[22] PCT Filed: Feb. 20, 1997

[86] PCT No.: PCT/IB97/00151

§ 371 Date: Nov. 16, 1998

§ 102(e) Date: Nov. 16, 1998

[87] PCT Pub. No.: WO97/31176

PCT Pub. Date: Aug. 28, 1997

[30] Foreign Application Priority Data

Feb. 22, 1996 [GB] United Kingdom ................... 9603732

[51] Int. Cl.[7] ........................................................ B23B 5/22

[52] U.S. Cl. ...................... 279/143; 228/114.5; 279/19.3; 279/19.4; 279/19.6; 279/145; 408/144; 408/226

[58] Field of Search ........................... 279/19, 19.3, 19.4, 279/19.6, 143, 145; 408/144, 226; 228/114.5

[56] References Cited

U.S. PATENT DOCUMENTS 1,765,362 6/1930 Berry ..................................... 279/145
3,452,421 7/1969 Cheng et al. ......................... 228/114.5
3,666,022 5/1972 Bailey et al. .
3,973,715 8/1976 Rust ..................................... 228/114.5
4,349,929 9/1982 Dewey .................................... 408/226
4,445,265 5/1984 Olson et al. .......................... 228/114.5
4,514,117 4/1985 Scott .................................. 408/239 R
4,818,157 4/1989 Kouvelis ................................ 279/145
4,844,482 7/1989 Röhm .
5,074,025 12/1991 Williard, III ............................ 408/226
5,203,654 4/1993 Henderson .............................. 408/226
5,211,100 5/1993 Fuller et al. .......................... 228/114.5
5,314,106 5/1994 Ambroziak et al. ................. 228/114.5

FOREIGN PATENT DOCUMENTS 0 586 337 8/1993 European Pat. Off. .
9002244 3/1990 WIPO ...................................... 408/67

*Primary Examiner*—Andrea L. Pitts
*Assistant Examiner*—Monica Smith
*Attorney, Agent, or Firm*—D. Peter Hochberg

[57] ABSTRACT

A shank adapter for a rock drill, which is used to connect one end of a drill string to a rock drill, has a chuck end (10) made from one piece of material and an opposite, threaded end (16) made from another, different, material. The chuck end and the threaded end are permanently joined to one another in one stage of manufacturing.

12 Claims, 2 Drawing Sheets

SHANK ADAPTER

This invention relates to shank adapters for rock drilling tools, and to a method of making a shank adapter. A shank adapter is used in rock drilling to connect a drill string (ie a set of drilling rods joined end to end with a drill bit at the remote end) to the chuck of a drill hammer. Shank adapters are sometimes also called lug chuck adapters.

The invention relates to the design and manufacture of a shank adapter and has benefits for both in-service performance and ease of manufacturing.

In the past, shank adapters have been machined from a single piece of solid homogenous material. The single piece is conventionally a solid bar or billet of uniform cylindrical section. Considerable machining effort is required to convert this single piece of material to the complex form of a shank adapter. Furthermore, in such adapters, different parts of the adapter, which experience different working loads, are made from material with the same mechanical properties. A compromise therefore has to be found by way of a material which will cope with different loads, while being less than optimum for any one working load.

According to the invention, there is provided a method of making a shank adapter wherein the chuck end of the adapter is made from one piece of material, the threaded end is made from another, different, material and the chuck end and the threaded end are permanently joined to one another in one stage of manufacturing.

The chuck end and the threaded end are preferably joined to one another by friction welding.

Friction welding is a known process for connecting metal parts. In friction welding, the surfaces of the parts to be joined are first pressed together with a high compression force (typically 10 Bar) and the parts are moved over one another in a direction generally normal to the direction of the compressive force. The friction between the parts produces high local temperatures resulting in local melting of the metal. In a second stage, the pressure is increased (to say 40 Bar), flash is formed between the surfaces and there is some length reduction between the surfaces as material is forced from the centre of the interface to the edge of the interface as a consequence of (a) the material's new found ability to flow, (b) the presence of centrifugal force due to the relative motion of the surfaces and (c) the presence of the compressive force. In a third stage, relative movement between the surfaces is stopped and there is large increase in compressive force (for example to 65 Bar) and the surfaces are forged together and the parts weld together as the locally melted metal solidifies.

In this case, the relative movement between the parts (head and shank) is a relative rotation about the bit axis.

The properties of the two materials used, respectively, for the chuck end and the threaded end can then each be optimised for different in-service demands.

It is within the scope of the invention for the shank adapter to include more than two different materials.

The threaded end can be made from a length of hollow bar stock which is preformed with an axial bore. This directly avoids one machining step which would otherwise be necessary (ie the drilling out of a bore). The length of hollow bar stock can however upset forged to form an enlargement at one end, and a thread can then machined into the material of the enlargement. In this way, it may be possible to enlarge the diameter of the part of the stock where the thread will be formed, and then to avoid having to machine the part of the stock which will form the shaft of the adapter.

The adapter is preferably carburised after the chuck end and the threaded end have been permanently joined to one another.

The invention also extends to a shank adapter wherein the chuck end of the adapter is made from one piece of material, the threaded end is made from another, different, material and the chuck end and the threaded end are permanently joined to one another.

The chuck end can be made from a high nickel chromium steel and the threaded end can be made from a chromium molybdenum steel. The material of the chuck ends can be selected from the following steels: EN29B, EN27, EN36, EN39, with EN36 and EN39 being preferred. The material of the threaded end can be selected from the following steels: EN40B, EN29A, EN29B, EN27, with EN40B and EN29A being preferred.

The material forming the threaded end will normally be less expensive than the material of the chuck end, and will desirably have a greater axial length than the material forming the chuck end. This can result in a substantially cheaper component.

The invention will now be further described, by way of example, with reference to the accompanying drawings, in which FIG. 1 is a side view of a shank adaptor in accordance with the invention;

Figures 3, 4A, 4B, 5A, 5B:
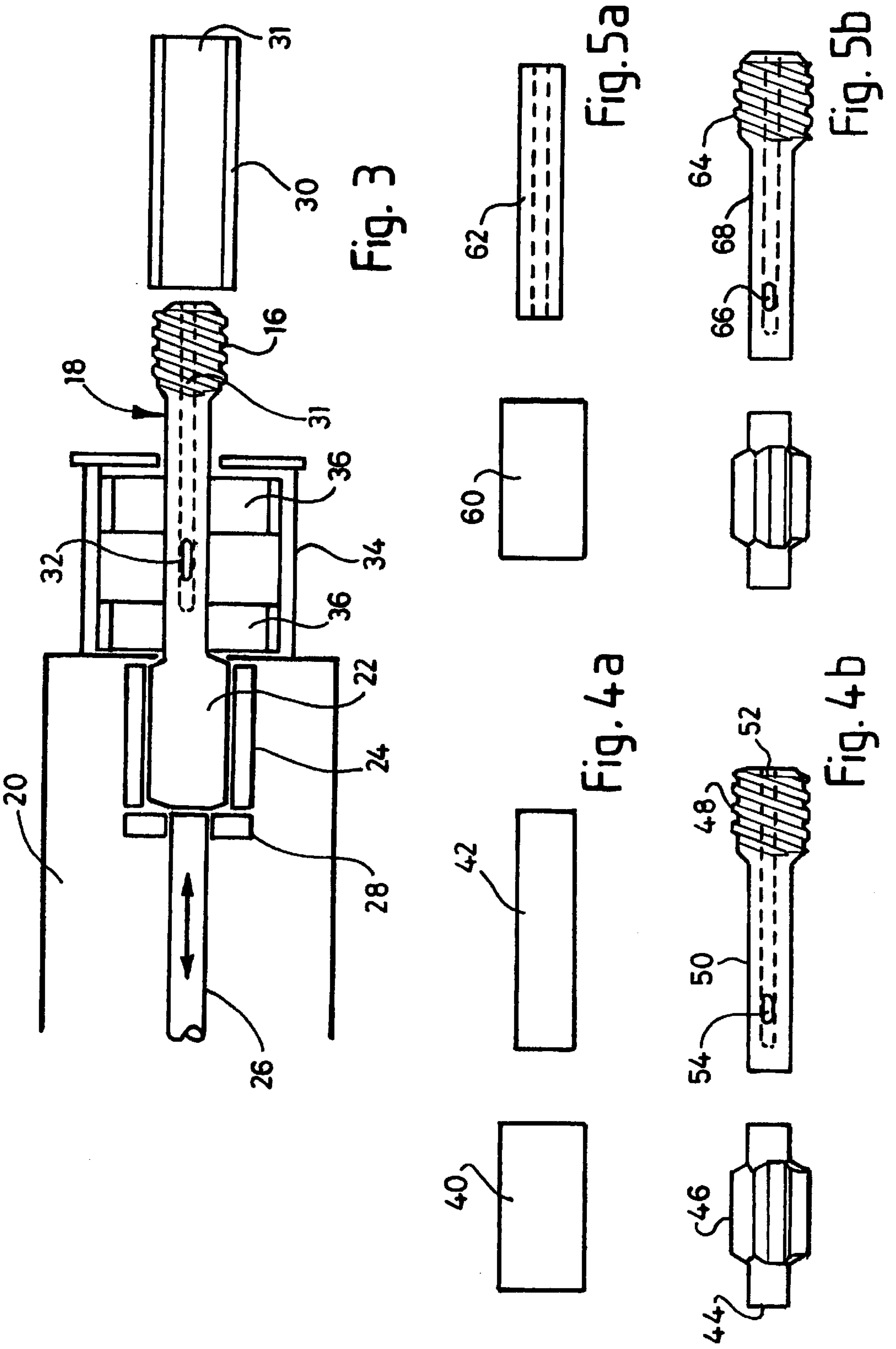
FIG. 3 shows a typical shank adapter fitted in a rock drill.

FIGS. 4*a* and 4*b* show two different stages in the manufacture of a first embodiment of shank adapter according to the invention; and FIGS. 5*a* and 5*b* show two different stages in the manufacture of a second embodiment of shank adapter according to the invention.

Figure 1:
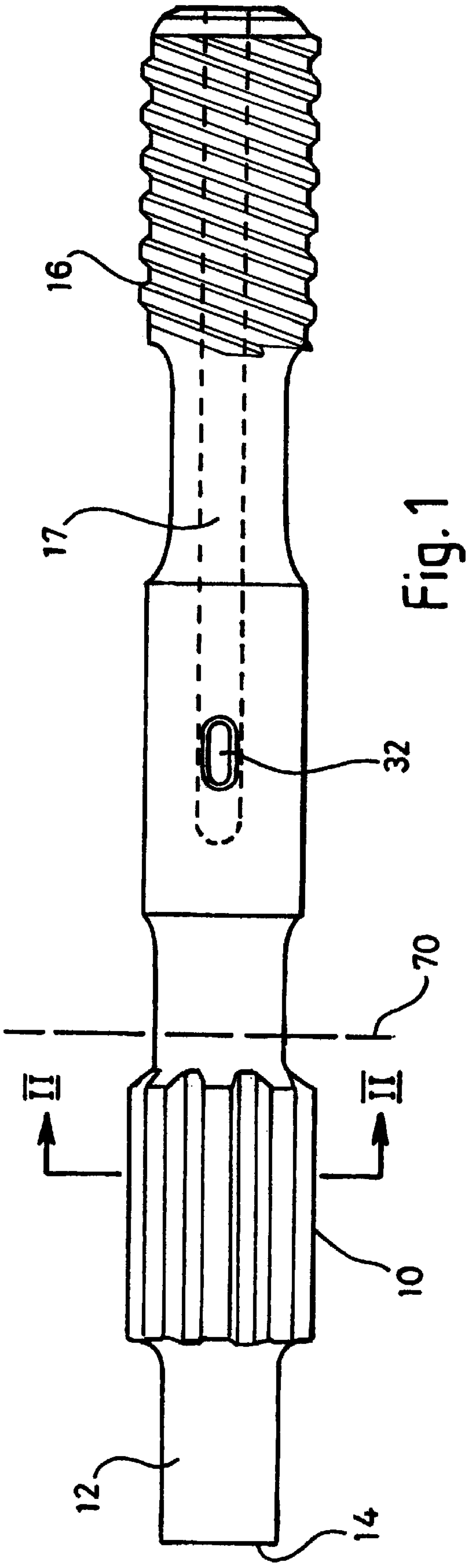
Figure 2:
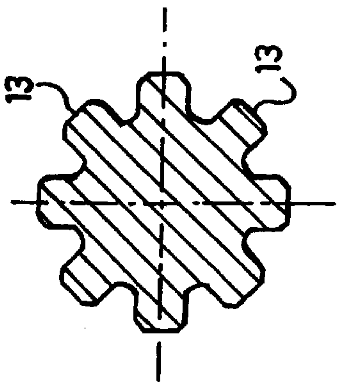
FIG. 2 is a cross-section through the splined area of the adapter of FIG. 1 on the line II—II.

FIG. 1 shows a shank adapter which has a splined area 10 from which a tail 12 extends, the tail ending in a struck face 14. In some designs of shank adapters, the tail is very short or non-existent, and the particular shape will depend upon the design of the drill into which the adapter is to fit. The splined area (with the splines 13 shown in cross-section in FIG. 2) fits into a correspondingly splined bushing in a rock drill, so that the rotation of the drill can be transmitted to the adapter.

The opposite end of the adapter has a male thread 16, onto which a drill string component can be screwed, using an industry standard thread form. In some cases, this end of the adapter can alternatively carry a female thread. A shaft 17 connects the two ends.

FIG. 3 shows how an adapter 18 fits into a schematically shown rock drill 20. It will be seen that the adapter in this case has no real tail to correspond to the tail 12 in FIG. 1. A splined portion 22 fits inside a chuck which includes a splined bushing 24, and a mechanism (not shown) is provided to rotate the bushing 24. A reciprocating piston 26 is guided in a piston guide 28. As the piston reciprocates, it strikes the struck end of the adapter. Through these two mechanisms, the adapter is simultaneously rotated and hammered in the direction of drilling.

FIG. 3 also shows a female coupling joint 30 which can be screwed onto the threaded end 16 of the adapter. A drill rod forming one end of a drill string will be connected to this coupling, and a drill bit will be mounted at the remote end of the string.

It is a requirement of such drilling that a flushing fluid be fed through the drill string to the bit to flush away debris from the cutting face of the bit. This debris is in the form of broken rock, which is to be flushed to the surface of the body of rock in which a hole is being bored. This flushing is necessary both to cool the bit and to remove broken rock to enhance the efficiency of drilling.

The adapter (and all components in the drill string) have a central bore 31 for the passage of the flushing fluid. The fluid (which is conventionally a water/air mixture) enters the adapter through a flushing hole 32. When the adapter is in position in the drill, the flushing hole is located within a water box 34, both ends of which are closed by seals 36. The flushing fluid introduced into this box enters the bore 31 through the hole 32, whatever the rotational position of the adapter within the box.

The shank adapter of FIGS. 4 is formed from two blocks, a chuck end block 40 and a threaded end block 42. The blocks are of dissimilar materials. The chuck end block will be machined to provide a struck face 44 and a splined part 46. The material of the block 40 will be chosen as optimum for the material requirements of the struck face and splines. Important criteria are toughness, fatigue resistance, hardness, impact toughness and strength in torsion.

The threaded end block 42 starts of as a length of bar, of smaller diameter than the block 40. This block will be machined to form a thread at 48 and to form a reduced diameter shaft area 50. Additional machining takes place to form a bore 52 and a flushing hole 54. The length of the bore is not critical, so long as it extends at least up to the full length of the flushing hole 54. The material of the block 42 will be chosen as optimum for the material requirements of the thread and the shaft. Important criteria are abrasion, torquing load, tensile stressing and notch sensitivity.

In FIGS. 5, the splined end block 60 will be the same as the block 40 of FIGS. 4. However the threaded end block 62 will start of as a length of hollow steel which is then formed externally with a thread 64 and has a flushing hole 66 machined through the wall.

The use of a hollow rod as starting point for the threaded end avoids the need for drilling a bore through a solid block. In one manufacturing process, it also may make it possible to start with a rod of diameter equal to the desired shaft diameter at 68, and then to form the larger diameter thread portion 64 by upset forging followed by a machining step to form the thread. This results in a particularly desirable metal grain structure which should give increased reliability and strength to the adapter.

Alternatively, the hollow rod can start off with a diameter slightly larger than the thread crest diameter (to allow for machining the thread), and the diameter of the rod can be reduced in other areas by machining away excess material.

In both cases, the two blocks are then joined to one another, preferably by friction welding.

The relative lengths of the blocks, and thus the position of the joint (indicated at 70 in FIG. 1) between the blocks, can be selected within a certain range. It will be desirable to minimise use of the more expensive material, subject to ensuring that sufficient mechanical properties are retained.

The fact that the bore of the hollow rod used in FIGS. 5 may extend well beyond the flushing hole is not of any importance.

FIGS. 1 and 3 show two different shaft forms; the shaft form is not of any particular relevance to this invention, and can vary in accordance with the requirements of the drill into which the adapter is to be fitted.

The machined blocks are placed in a friction welding machine. In the welding machine, the parts are forced together and rotated relative to one another so that a welded joint is formed between them. In the process of friction welding, there will be some length reduction, and the design of the separate parts must take this into account, so that the overall length of the finished adapter is correct.

After joining of the blocks, any flash must be machined off, and then any surface hardening can be imparted to the adapter, possibly by carburization. The carburising parameters will have to take into account the fact that the adapter now consists of two different materials which will respond to carburising to different extents.

Through this new adapter construction, where two blocks are joined (or fused) together with, for example, friction welding as a method of joining, dissimilar materials are now used in a proactive engineering approach to optimise the adapter material wear resistance and mechanical properties. In the case of the chuck end block, a specific material is used in order to contend with a specific abrasive circumstance, rate and degree of wear. A good impact resistant, fracture resistant steel such as high nickel chromium molybdenum steel could be used. EN27, EN36 and EN39 would all be suitable. In the case of the threaded end block, a material which is less expensive but which has good strength, good wear resistance but lower toughness than the chuck end block could be used. Examples of such steels are EN40B, EN29A and EN29B.

Particularly good results would be expected with EN39 for the chuck end and EN29 for the threaded end and shaft. Some steels, for example EN29B and EN27 could be used at either end.

Advantages are achieved through the joining of two dissimilar materials whose characteristic properties can be exploited to counter the wear circumstances of the various working surfaces, fatigue and repeated shock waves. The main features of the invention are:

A combination of two dissimilar materials to be specifically designed for the requirements of chuck end block or the threaded end block.

Blocks joined together to form a single shank adapter.

Design strategy is the parallel (simultaneous) design of two or more blocks of the shank adapter.

The design process considers the requirements of specific wear interfaces, working surfaces, and maximises the material and associated surface and/or heat treatment to meet these requirements.

These features produce the following advantages:

Use of hollow drill steel eliminates the need for the bore to be machined for the purposes of creating a flushing hole and reduces the volume of material removed from the billet material to arrive at the required outside diameter.

Product wear resistance is optimised for wear surfaces, working surfaces, that experience a disparity in mode (type), rates and degrees of wear during service.

No longer is there a compromise of the product's potential performance as the need to meet a "happy medium" between, for example the chuck end block and the threaded end block requirements, a central demand of the prior design process, is eliminated.

The design process considers the requirements of specific working surfaces, specific wear interfaces and maximises the material to meet these requirements.

What is claimed is:

1. A method of making a shank adapter wherein a chuck end of the adapter is made from one piece of material, a threaded end is made from another, different, material and the chuck end and the threaded end are permanently joined to one another in one stage of manufacturing.

2. A method as claimed in claim 1, wherein the chuck end and the threaded end are joined to one another by friction welding.

3. A method as claimed in claim 1, wherein the threaded end is made from a length of hollow bar stock which is preformed with an axial bore.

4. A method as claimed in claim 3, wherein the length of hollow bar stock is upset forged to form an enlargement at one end and a thread is machined into the material of the enlargement.

5. A method as claimed in claim 3, wherein an original diameter of the hollow bar stock is not changed to form a shaft between the threaded end and the chuck end.

6. A method as claimed in claim 1, wherein the adapter is carburised after the chuck end and the threaded end have been permanently joined to one another.

7. A shank adapter wherein a chuck end of the adapter is made from one piece of material, a threaded end is made from another, different, material and the chuck end and the threaded end are permanently joined to one another.

8. A shank adapter as claimed in claim 7, wherein the chuck end is made from a high nickel chromium steel.

9. A shank adapter as claimed in claim 7, wherein the threaded end is made from a chromium molybdenum steel.

10. A shank adapter as claimed in claim 7, wherein the material of the chuck ends is selected from the following steels: EN29B, EN27, EN36, EN39.

11. A shank adapter as claimed in claim 7, wherein the material of the chuck ends is from the following steels: EN36, EN39.

12. A shank adaptor as claimed in claim 7, wherein the material forming the threaded end has a greater axial length than the material forming the chuck end.

* * * * *